United States Patent
Feldman et al.

(10) Patent No.: US 7,530,929 B2
(45) Date of Patent: May 12, 2009

(54) MOTION PLATFORM SYSTEM AND METHOD OF ROTATING A MOTION PLATFORM ABOUT PLURAL AXES

(75) Inventors: Philip Feldman, Catonsville, MD (US);
Thomas Bruni, Baltimore, MD (US);
Greg Merril, Bethesda, MD (US)

(73) Assignee: PowerGrid Fitness, Inc., Laurel, MD (US)

( * ) Notice: Subject to any disclaimer, the term of this patent is extended or adjusted under 35 U.S.C. 154(b) by 0 days.

(21) Appl. No.: 11/360,994

(22) Filed: Feb. 24, 2006

(65) Prior Publication Data

US 2006/0211543 A1    Sep. 21, 2006

Related U.S. Application Data

(62) Division of application No. 10/289,464, filed on Nov. 6, 2002, now Pat. No. 7,033,176.

(60) Provisional application No. 60/396,130, filed on Jul. 17, 2002.

(51) Int. Cl.
*A63B 21/00* (2006.01)

(52) U.S. Cl. ............................. 482/57; 482/51; 434/61; 434/55

(58) Field of Classification Search .................. 482/51, 482/54, 57, 146; 434/55–62, 247, 33, 67, 434/29, 14, 243, 253, 28, 35, 1, 59, 60, 39, 434/94

See application file for complete search history.

(56) References Cited

U.S. PATENT DOCUMENTS

| 2,715,007 | A | 8/1955 | Zeitlin |
| D188,376 | S | 7/1960 | Hotkins et al. |

(Continued)

FOREIGN PATENT DOCUMENTS

DE    19900442 A1    7/2000

(Continued)

OTHER PUBLICATIONS

"Military: Arcade Aces," Popular Mechanics, Mar. 1982, 1 page.

(Continued)

*Primary Examiner*—Glenn Richman
(74) *Attorney, Agent, or Firm*—Edell, Shapiro & Finnan, LLC

(57) ABSTRACT

A motion platform system includes a support and a motion platform supported by the support and rotatable about a plurality of bearing axes The motion platform is further rotatable with respect to the support about at least one axis that is offset from the plurality of bearing axes. The motion platform may include an intermediate frame supported by the support, where the intermediate frame is rotatable about a first bearing axis with respect to the support. The motion platform may further include an inner frame supported by the intermediate frame, where the inner frame is rotatable about a second bearing axis with respect to the intermediate frame. Rotations of the inner and intermediate frames about the first and second bearing axes facilitate rotation of the inner frame with respect to the support about at least one axis offset from the bearing axes.

16 Claims, 8 Drawing Sheets

U.S. PATENT DOCUMENTS

| | | | |
|---|---|---|---|
| 3,170,687 A | 2/1965 | Lugger | |
| 3,428,312 A | 2/1969 | Machen | |
| 3,873,087 A | 3/1975 | Burkart et al. | |
| 4,026,279 A | 5/1977 | Simjian | |
| 4,296,931 A | 10/1981 | Yokoi | |
| 4,337,050 A | 6/1982 | Engalitcheff, Jr. | |
| 4,494,754 A | 1/1985 | Wagner, Jr. | |
| 4,588,054 A | 5/1986 | LeBaron | |
| 4,630,817 A | 12/1986 | Buckley | |
| 4,660,828 A | 4/1987 | Weiss | |
| 4,680,577 A | 7/1987 | Straayer et al. | |
| 4,691,694 A | 9/1987 | Boyd et al. | |
| 4,711,447 A | 12/1987 | Mansfield | |
| 4,742,832 A | 5/1988 | Kauffmann et al. | |
| 4,855,704 A | 8/1989 | Betz | |
| 4,890,495 A | 1/1990 | Slane | |
| 4,938,474 A | 7/1990 | Sweeney et al. | |
| 4,949,993 A | 8/1990 | Stark et al. | |
| D318,073 S | 7/1991 | Jang | |
| 5,054,771 A | 10/1991 | Mansfield | |
| 5,060,932 A | 10/1991 | Yamaguchi | |
| 5,089,960 A | 2/1992 | Sweeney, Jr. | |
| 5,104,119 A | 4/1992 | Lynch | |
| 5,116,296 A | 5/1992 | Watkins et al. | |
| 5,118,094 A | 6/1992 | Lambert | |
| 5,151,071 A | 9/1992 | Jain et al. | |
| 5,199,875 A * | 4/1993 | Trumbull | 434/62 |
| 5,299,810 A | 4/1994 | Pierce et al. | |
| 5,312,315 A | 5/1994 | Mortensen et al. | |
| 5,318,491 A | 6/1994 | Houston | |
| 5,353,242 A | 10/1994 | Crosbie et al. | |
| 5,360,383 A | 11/1994 | Boren | |
| 5,362,298 A | 11/1994 | Brown et al. | |
| 5,368,546 A | 11/1994 | Stark et al. | |
| 5,431,569 A | 7/1995 | Simpkins et al. | |
| 5,462,503 A | 10/1995 | Benjamin et al. | |
| 5,466,200 A | 11/1995 | Ulrich et al. | |
| 5,515,078 A | 5/1996 | Greschler et al. | |
| 5,547,439 A | 8/1996 | Rawls et al. | |
| 5,551,693 A | 9/1996 | Goto et al. | |
| 5,551,920 A * | 9/1996 | Ogden et al. | 472/59 |
| 5,562,572 A | 10/1996 | Carmein | |
| D376,826 S | 12/1996 | Ashida | |
| 5,584,700 A | 12/1996 | Feldman et al. | |
| 5,591,104 A | 1/1997 | Andrus et al. | |
| 5,610,631 A | 3/1997 | Bouton et al. | |
| 5,618,251 A | 4/1997 | Sullivan | |
| 5,642,496 A | 6/1997 | Kanfi | |
| 5,643,146 A | 7/1997 | Stark et al. | |
| D384,115 S | 9/1997 | Wilkinson et al. | |
| 5,669,773 A | 9/1997 | Gluck | |
| 5,689,285 A | 11/1997 | Asher | |
| 5,690,582 A | 11/1997 | Ulrich et al. | |
| 5,713,794 A | 2/1998 | Shimojima et al. | |
| 5,716,274 A | 2/1998 | Goto et al. | |
| 5,721,566 A | 2/1998 | Rosenberg et al. | |
| 5,782,639 A | 7/1998 | Beal | |
| 5,785,630 A | 7/1998 | Bobick et al. | |
| D397,164 S | 8/1998 | Goto | |
| 5,792,031 A | 8/1998 | Alton | |
| 5,813,958 A * | 9/1998 | Tomita | 482/146 |
| 5,829,982 A | 11/1998 | Advani et al. | |
| D402,317 S | 12/1998 | Goto | |
| 5,853,326 A | 12/1998 | Goto et al. | |
| 5,889,507 A | 3/1999 | Engle et al. | |
| D407,758 S | 4/1999 | Isetani et al. | |
| 5,890,995 A | 4/1999 | Bobick et al. | |
| 5,897,469 A | 4/1999 | Yalch | |
| 5,901,612 A | 5/1999 | Letovsky | |
| 5,904,639 A | 5/1999 | Smyser et al. | |
| D411,258 S | 6/1999 | Isetani et al. | |
| 5,921,899 A | 7/1999 | Rose | |
| 5,929,782 A | 7/1999 | Stark et al. | |
| 5,947,824 A * | 9/1999 | Minami et al. | 463/37 |
| 5,973,679 A | 10/1999 | Abbott et al. | |
| 5,980,256 A | 11/1999 | Carmein | |
| 5,989,157 A | 11/1999 | Walton | |
| D421,070 S | 2/2000 | Jang et al. | |
| 6,037,927 A | 3/2000 | Rosenberg | |
| 6,038,940 A * | 3/2000 | Rosheim | 74/490.11 |
| 6,044,772 A | 4/2000 | Gaudette et al. | |
| 6,050,822 A | 4/2000 | Faughn | |
| 6,086,518 A | 7/2000 | MacCready, Jr. | |
| 6,102,832 A | 8/2000 | Tani | |
| 6,106,301 A | 8/2000 | Merril | |
| D431,051 S | 9/2000 | Goto | |
| 6,123,647 A | 9/2000 | Mitchell | |
| 6,147,674 A | 11/2000 | Rosenberg et al. | |
| 6,152,854 A | 11/2000 | Carmein | |
| D434,769 S | 12/2000 | Goto | |
| D434,770 S | 12/2000 | Goto | |
| 6,203,432 B1 | 3/2001 | Roberts et al. | |
| 6,216,547 B1 | 4/2001 | Lehtovaara | |
| D441,369 S | 5/2001 | Goto | |
| 6,228,000 B1 | 5/2001 | Jones | |
| 6,231,444 B1 | 5/2001 | Goto et al. | |
| D444,469 S | 7/2001 | Goto | |
| 6,296,595 B1 | 10/2001 | Stark et al. | |
| 6,325,767 B1 | 12/2001 | Wolff et al. | |
| 6,330,837 B1 | 12/2001 | Charles et al. | |
| 6,353,427 B1 | 3/2002 | Rosenberg | |
| 6,355,048 B1 | 3/2002 | Hong et al. | |
| 6,359,613 B1 | 3/2002 | Poole | |
| D456,410 S | 4/2002 | Ashida | |
| D456,854 S | 5/2002 | Ashida | |
| D457,570 S | 5/2002 | Brinson | |
| 6,388,655 B1 | 5/2002 | Leung | |
| 6,394,905 B1 | 5/2002 | Takeda et al. | |
| 6,406,408 B1 | 6/2002 | Price, II | |
| D459,727 S | 7/2002 | Ashida | |
| D460,506 S | 7/2002 | Tamminga et al. | |
| D462,683 S | 9/2002 | Ashida | |
| 6,482,010 B1 | 11/2002 | Marcus et al. | |
| 6,514,145 B1 | 2/2003 | Kawabata et al. | |
| D471,594 S | 3/2003 | Nojo | |
| 6,568,334 B1 | 5/2003 | Gaudette et al. | |
| 6,612,170 B2 | 9/2003 | Brown | |
| 6,616,579 B1 | 9/2003 | Reinbold et al. | |
| 6,624,802 B1 | 9/2003 | Klein et al. | |
| 6,636,161 B2 | 10/2003 | Rosenberg | |
| 6,663,058 B1 | 12/2003 | Peterson et al. | |
| 6,676,569 B1 | 1/2004 | Radow | |
| 6,693,622 B1 | 2/2004 | Shahoian et al. | |
| 6,726,566 B2 | 4/2004 | Komata | |
| 6,733,293 B2 * | 5/2004 | Baker et al. | 434/55 |
| 6,743,154 B2 | 6/2004 | Epstein | |
| 6,770,040 B2 | 8/2004 | Perner et al. | |
| 6,774,885 B1 | 8/2004 | Even-Zohar | |
| D500,100 S | 12/2004 | van der Meer | |
| 6,859,198 B2 | 2/2005 | Onodera et al. | |
| 6,888,076 B2 | 5/2005 | Hetherington | |
| D510,391 S | 10/2005 | Merril et al. | |
| 6,975,302 B1 | 12/2005 | Ausbeck, Jr. | |
| 6,991,483 B1 | 1/2006 | Milan et al. | |
| D514,627 S | 2/2006 | Merril et al. | |
| 6,994,627 B2 | 2/2006 | Menosky et al. | |
| 7,004,787 B2 | 2/2006 | Milan | |
| D517,124 S | 3/2006 | Merril et al. | |
| 7,011,605 B2 | 3/2006 | Shields | |
| 7,033,176 B2 | 4/2006 | Feldman et al. | |
| 7,083,546 B2 | 8/2006 | Zillig et al. | |
| 7,121,982 B2 | 10/2006 | Feldman | |
| 7,125,388 B1 | 10/2006 | Reinkensmeyer et al. | |
| 7,139,983 B2 | 11/2006 | Kelts | |

| | | |
|---|---|---|
| 7,158,118 B2 | 1/2007 | Liberty |
| 7,160,233 B2 | 1/2007 | Perez |
| 7,262,760 B2 | 8/2007 | Liberty |
| 7,331,226 B2 | 2/2008 | Feldman et al. |
| 7,414,611 B2 | 8/2008 | Liberty |
| 2001/0018363 A1 | 8/2001 | Goto et al. |
| 2002/0055424 A1 | 5/2002 | Brown |
| 2002/0080115 A1 | 6/2002 | Onodera et al. |
| 2002/0185041 A1 | 12/2002 | Herbst |
| 2003/0033885 A1 | 2/2003 | Knox et al. |
| 2003/0069108 A1 | 4/2003 | Kaiserman et al. |
| 2003/0119638 A1 | 6/2003 | Chan |
| 2003/0171190 A1 | 9/2003 | Rice |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0097336 A1 | 5/2004 | Chuang |
| 2004/0097337 A1 | 5/2004 | Chuang |
| 2004/0099513 A1 | 5/2004 | Hetherington |
| 2004/0110602 A1 | 6/2004 | Feldman |
| 2004/0180719 A1 | 9/2004 | Feldman et al. |
| 2004/0214639 A1 | 10/2004 | Makuta |
| 2004/0259688 A1 | 12/2004 | Stabile |
| 2005/0049116 A1 | 3/2005 | Huang |
| 2005/0070154 A1 | 3/2005 | Milan |
| 2005/0130742 A1 | 6/2005 | Feldman et al. |
| 2006/0046849 A1 | 3/2006 | Kovacs |
| 2006/0097453 A1 | 5/2006 | Feldman et al. |
| 2006/0111181 A1 | 5/2006 | Thorsen |
| 2006/0139317 A1 | 6/2006 | Leu et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0260395 A1 | 11/2006 | Feldman et al. |
| 2007/0066394 A1 | 3/2007 | Ikeda et al. |
| 2007/0072680 A1 | 3/2007 | Ikeda |
| 2007/0155589 A1 | 7/2007 | Feldman et al. |
| 2007/0219050 A1 | 9/2007 | Merril |
| 2007/0298883 A1 | 12/2007 | Feldman et al. |
| 2008/0146336 A1 | 6/2008 | Feldman et al. |

FOREIGN PATENT DOCUMENTS

| | | |
|---|---|---|
| GB | 2038597 A | 7/1980 |
| JP | 11309270 | 9/1999 |
| WO | 9111221 | 8/1991 |
| WO | 0057387 A1 | 9/2000 |

OTHER PUBLICATIONS

"Suncom Aerobics Joystick," www.atarihq.com, Retreived from Internet Sep. 19, 2002, 1 page.
Aukstakalnis, et al., "The Art and Science of Virtual Reality: Silicon Mirage," pp. 197-205.
Hamit, F., "Virtual Reality and the Exploration of Cyberspace," Jun. 1, 1993, 4 pages.
"The Race Begins with $85," Randal Sports, 1990, 1 page.
"The New Exertainment System," Life Fitness, 1995, 1 page.
"The History of Nintendo (1889-1997)," Retrieved from Internet Aug. 24, 1998, pp. 1 and 9-10.
Skorupa, J., "Virtual Fitness," Sports Science, Popular Mechanics, Oct. 1994, 3 pages.
Manning R., "Videogame Players Get a Workout with the Exertainment," The Courier-Journal Sep. 25, 1994, 1 page.
Shah, "Mad Catz Universal MC2 Racing Wheel," Feb. 18, 2005.
"Universal S-Video/Audio Cable," Retrieved from the Internet, www.madcatz.com.
Tom Dang et al., "Interactive Video Exercise System for Pediatric Brain Injury Rehabilitation," Proceedings of the RESNA 20th Annual Conference, Jun. 1998; 3 pages.
"Innovation in Action," Biofeedback Motor Control GmbH; 2 pages.
Glas, V, "Chair Puts Player on the Joystick," Machine Design; Penton, Inc., vol. 63, No. 21, Oct. 24, 1991, p. 73.
"AGH's Atari Project Puffer Page," http://www.atarihq.com/othersec/puffer/index.html, retrieved from the internet on Sep. 19, 2002, 4 pages.
"The Legible City," www.jeffrey-shaw.net, retrieved from the internet on Sep. 19, 2002, 3 pages.
Antonoff, M, "Living in a Virtual World," Popular Science, Jun. 1993, 2 pages.
Antonoff, M, "Virtual Violence: Boxing without Bruises," Popular Science, Apr. 1993, 1 page.
Brown, S, "Video Cycle Race," Popular Science, May 1989, 1 page.
"Wii Fit", Wikipedia, http://en.wikipedia.org/wiki/Wii_Fit, retrieved from Internet Aug, 27, 2007.
"Nintendo E3 2007—Wii Fit", http://e3nin.nintendo.com/wii_fit.html, retrieved from Internet Aug. 27, 2007.
Justin McElroy, "WiiFit Gonna Make You Sweat—Joystiq", http://www.joystiq.com/2007/07/11/wiifit-gonna-make-you-sweat/, Jul. 11, 2007.

* cited by examiner

MOTION PLATFORM SYSTEM AND METHOD OF ROTATING A MOTION PLATFORM ABOUT PLURAL AXES

CROSS REFERENCE TO RELATED APPLICATIONS

This application is a divisional of U.S. patent application Ser. No. 10/289,464, entitled "Motion Platform System and Method of Rotating a Motion of Platform About Plural Axes", and filed Nov. 6, 2002, now U.S. Pat. No. 7,033,176 which claims priority from U.S. Provisional Patent Application Ser. No. 60/396,130, entitled "Motion Platform System and Method for Effecting Rotation of an Internal Frame About Plural Axes" and filed Jul. 17, 2002. The disclosure of the above-mentioned patent application are incorporated herein by reference in their entireties.

BACKGROUND OF THE INVENTION

1. Technical Field

The present invention pertains to motion platform systems. In particular, the present invention pertains to a motion platform system for use in exercise or other equipment (e.g., various simulators, etc.) that rotates a motion platform structure via bearing axes displaced from the platform rotation axes.

2. Discussion of the Related Art

Current motion platforms are capable of moving a human-sized payload in multiple degrees of freedom. These types of platforms include Stewart platforms, Gough platforms and parallel link systems. Further, U.S. Pat. No. 5,431,569 (Simpkins et al) discloses a motion simulator that uses an existing personal computer and off the shelf software to physically simulate and control the motions of a computer generated vehicle. The motion simulator is manually powered by the user and includes a control stick connected to a computer input, whereby control stick movement is translated into movement of the computer generated vehicle. A rigid control arm connects the control stick to a base unit and to a cockpit frame to move the cockpit frame relative to the base unit as the control stick is moved. The center of gravity of the cockpit is located below the pitch and roll axes so the cockpit tends to return to an initial position.

U.S. Pat. No. 6,330,837 (Charles et al) discloses a parallel mechanism capable of positioning and orienting an end platform with up to six or more degrees of freedom. The mechanism includes six links having first and second ends. The first end is connected to an end platform for supporting a tool, while the second end is connected to an actuator capable of translating the second end. A rotational drive mechanism may be provided for rotating an object mounted on the end platform at varying orientations of the end platform independently of movement of the end platform as a whole.

U.S. Pat. No. 6,357,827 (Brightbill et al) discloses a device including a two degree-of-freedom pivot supporting a platform. In particular, this patent discloses a portable seat including one or more moving seating assemblies. A motion mechanism provides each seating assembly with at least one of total rocking, vertical, lateral and turning movement. The seating assemblies are provided at a neutral angle that corresponds to the particular seat application, while the amount of rocking and/or vertical movement is based on the neutral angle. The neutral angle orientation, rocking movement and vertical movement in combination cause the weight supported by occupant seat bones, posterior and thighs to be optimally distributed on the seating assembly, thereby improving seating comfort as applied to a given seating environment.

However, the above types of platform systems tend to be large and require external power sources to achieve movement. Further, a majority of the systems, including the Brightbill et al device, are configured where the center of rotation must exist outside of the work envelope (e.g., systems employing a two degree-of-freedom pivot to support a platform). System configurations including a center of rotation within the work envelope, such as a Stewart platform, typically require computer control to move multiple axes and offset the center of rotation to a desired location.

In an attempt to overcome some of the aforementioned problems, the related art provides a gimbal mechanism. The gimbal is compact (e.g., capable of fitting into a small space) and requires low power for actuation. Typically, a chair or other support is attached to a gimbal, where a pitch or horizontal axis is perpendicular to a user or object being manipulated, while a roll axis is aligned with the user or object orientation. Since the gimbal axes may be arranged to traverse a center of mass, the system may be balanced to achieve movement with reduced power. For example, U.S. Pat. No. 6,037,927 (Rosenberg) discloses an apparatus for interfacing movement of a shaft with a computer. The apparatus includes a support, a gimbal mechanism having two degrees of freedom, and three electromechanical transducers. The gimbal mechanism has a base portion rotatably coupled to the support to provide a first degree of freedom and an object receiving portion rotatably coupled to the base portion to provide a second degree of freedom. A first electromechanical transducer is coupled between the support and base portion, a second electromechanical transducer is coupled between the base portion and object receiving portion, and a third electromechanical transducer is coupled between the object receiving portion and an elongated object that is at least partially disposed within the object receiving portion. When a shaft is engaged with the gimbal mechanism, the shaft can move in three degrees of freedom in a spherical coordinate space, where each degree of freedom is sensed by one of the three transducers. A fourth transducer can be used to sense rotation of the shaft about an axis.

The gimbal type mechanism suffers from several disadvantages with respect to human sized payloads. In particular, gimbal ergonomics typically require both pitch and roll axes to be supported on one side, thereby producing a significantly cantilevered system. This tends to result in either a massively overbuilt frame or an excessively springy or bouncy mechanism.

OBJECTS AND SUMMARY OF THE INVENTION

Accordingly, it is an object of the present invention to enable rotation of a motion platform about plural axes via bearing axes displaced from those rotation axes.

It is another object of the present invention to configure a motion platform that is compact in size and facilitates easy user manipulation.

Yet another object of the present invention is to ease user ingress and egress into and out of a user support structure of a motion platform.

Still another object of the present invention is to configure a motion platform for use in a variety of exercise and/or simulation devices.

The aforesaid objects are achieved individually and/or in combination, and it is not intended that the present invention be construed as requiring two or more of the objects to be combined unless expressly required by the claims attached hereto.

According to the present invention, a motion platform system includes a motion platform rotatable about a plurality of bearing axes and a support structure supporting the platform. The motion platform rotates relative to the support structure about one or more, but preferably two, axes offset from the bearing axes, and includes an inner frame supported by an intermediate frame. The intermediate frame is rotatable about a first bearing axis, while the inner frame is rotatable about a second bearing axis substantially perpendicular to the first bearing axis. A user manipulable actuator for each bearing axis is disposed proximate the inner frame to control rotation of the platform relative to the support structure. The bearing axes are arranged to enable rotational forces of the inner and intermediate frames to combine and produce a net platform rotation about virtual pitch and roll axes which are angularly displaced from the bearing axes by approximately forty-five degrees. In other words, the actuators control rotation of the inner and intermediate frames to produce net pitch and roll motion of the platform. The displacement of the platform bearing axes from the virtual axes eases user access to the platform.

In effect, the system is basically a two degree-of-freedom gimbal type mechanism with bearing axes angularly displaced from conventional pitch and roll gimbal axes by approximately forty-five degrees to permit entry and egress to the platform. The system is compact to enable a device to include dimensions slightly greater than a user, and establishes virtual pitch and roll axes angularly displaced from the bearing axes as described above. This is accomplished by assigning user manipulable actuators to each bearing axis, where manipulation of the actuators in the same direction produces platform pitch motion and manipulation of the actuators in opposite directions produces platform roll motion.

The present invention provides several advantages. Initially, various applications may benefit by employing a platform of the present invention that is stable and lightweight, requires low power and includes minimal dimensions sufficient to accommodate a user and a center of rotation within the volume housing the user. The applications include economical flight and driving simulations, location-based entertainment virtual rides (e.g., roller coasters, space flight, etc.) and plural axes exercise machines (e.g., that preferably exercise substantially the entire body). The present invention provides the above features by initially rotating the platform pivoting mechanism by approximately forty-five degrees within the plane containing platform pitch and roll axes. This permits easy entry and egress by a user to the platform without employing a heavy, cantilevered structure. Further, user manipulable actuators each control rotation about a respective platform bearing axis, thereby enabling motion about the conventional pitch and roll axes (e.g., which are displaced from the bearing axes) and resulting in a compact and lightweight motion platform that provides excellent entry and egress for a user.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

DETAILED DESCRIPTION OF THE PREFERRED EMBODIMENTS

Figure 1:
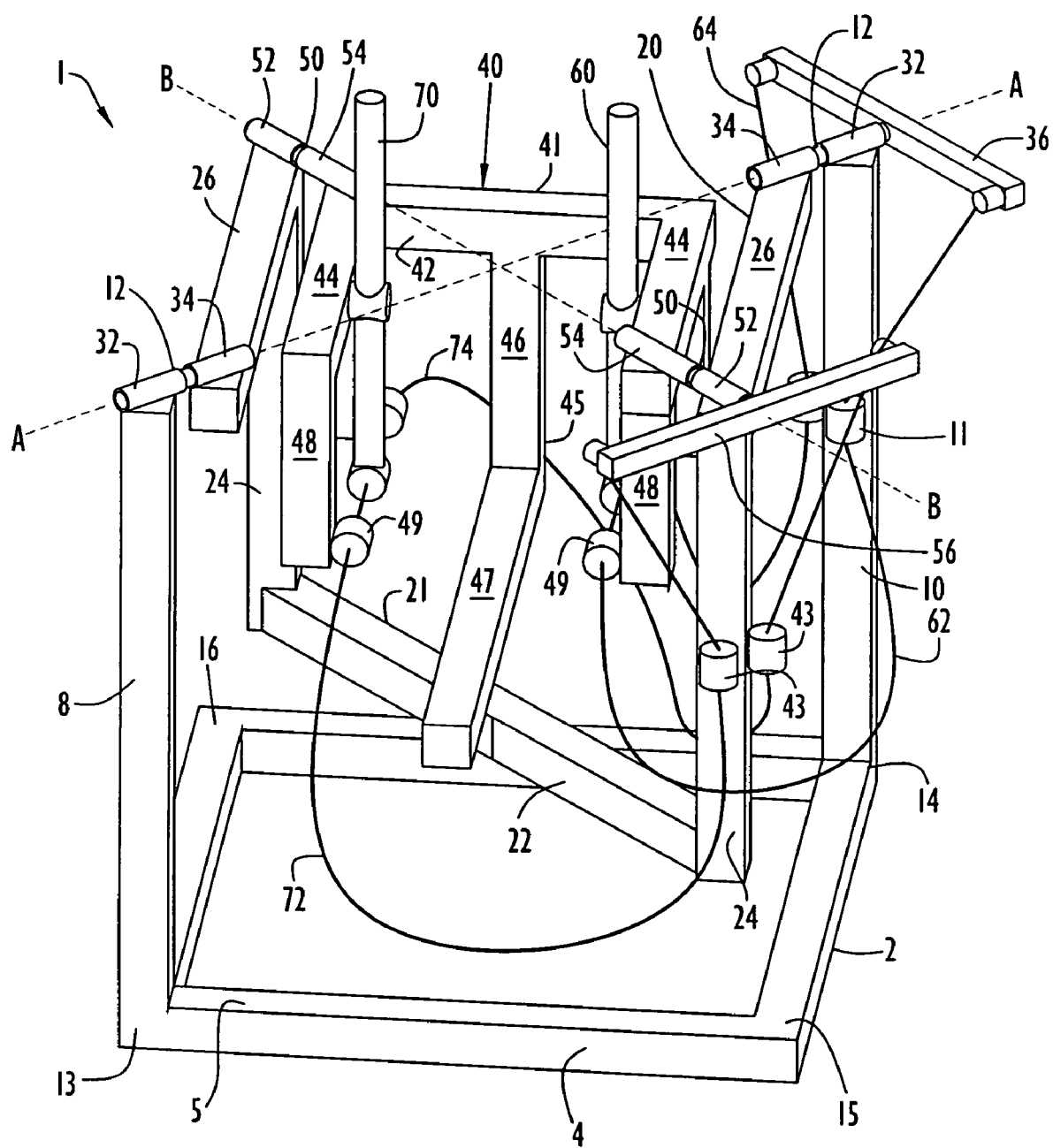
FIG. 1 is a front view in perspective of a plural frame system in accordance with the present invention.
Figure 2:
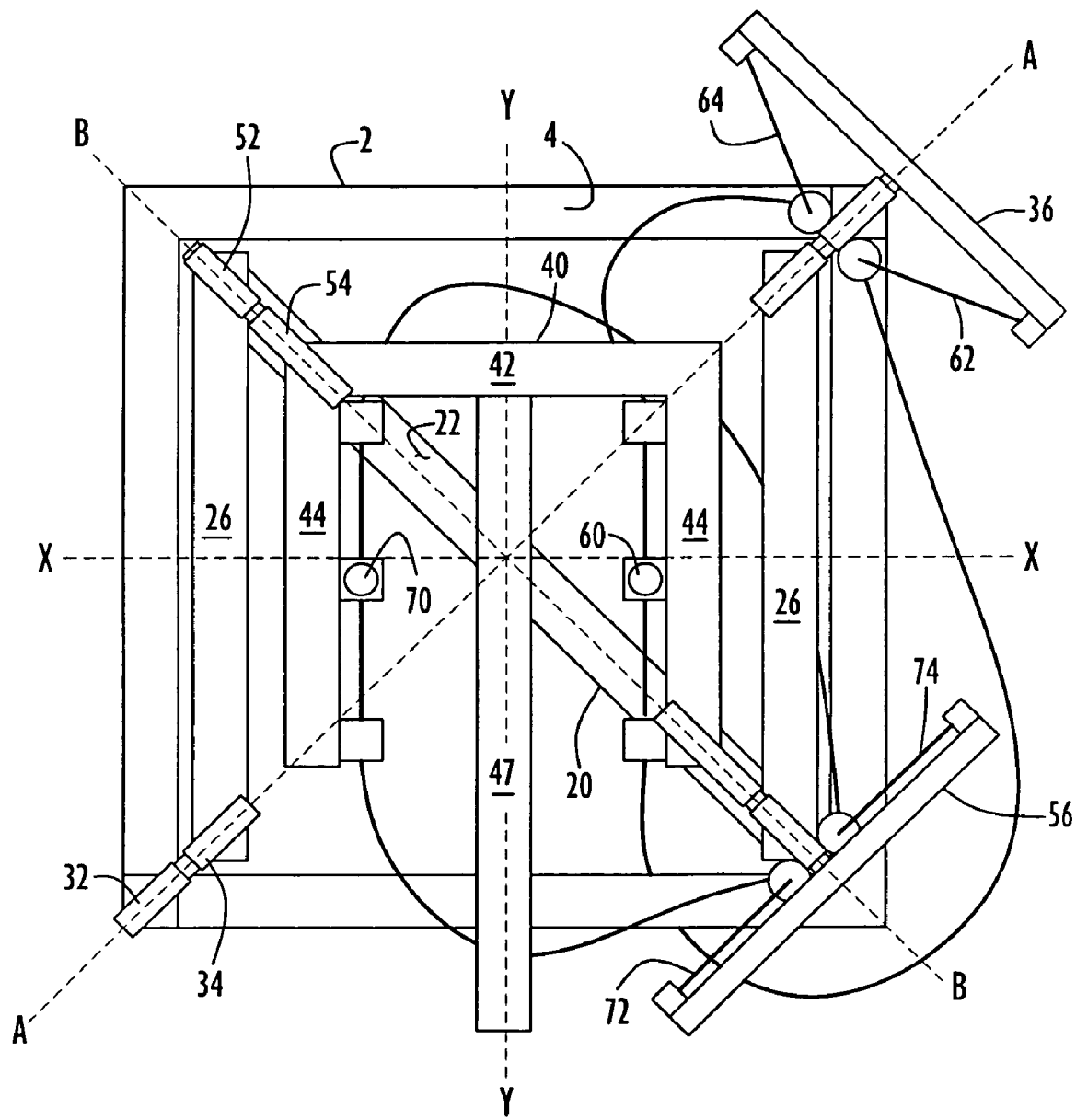
FIG. 2 is a top view of the system of FIG. 1.
Figure 3:
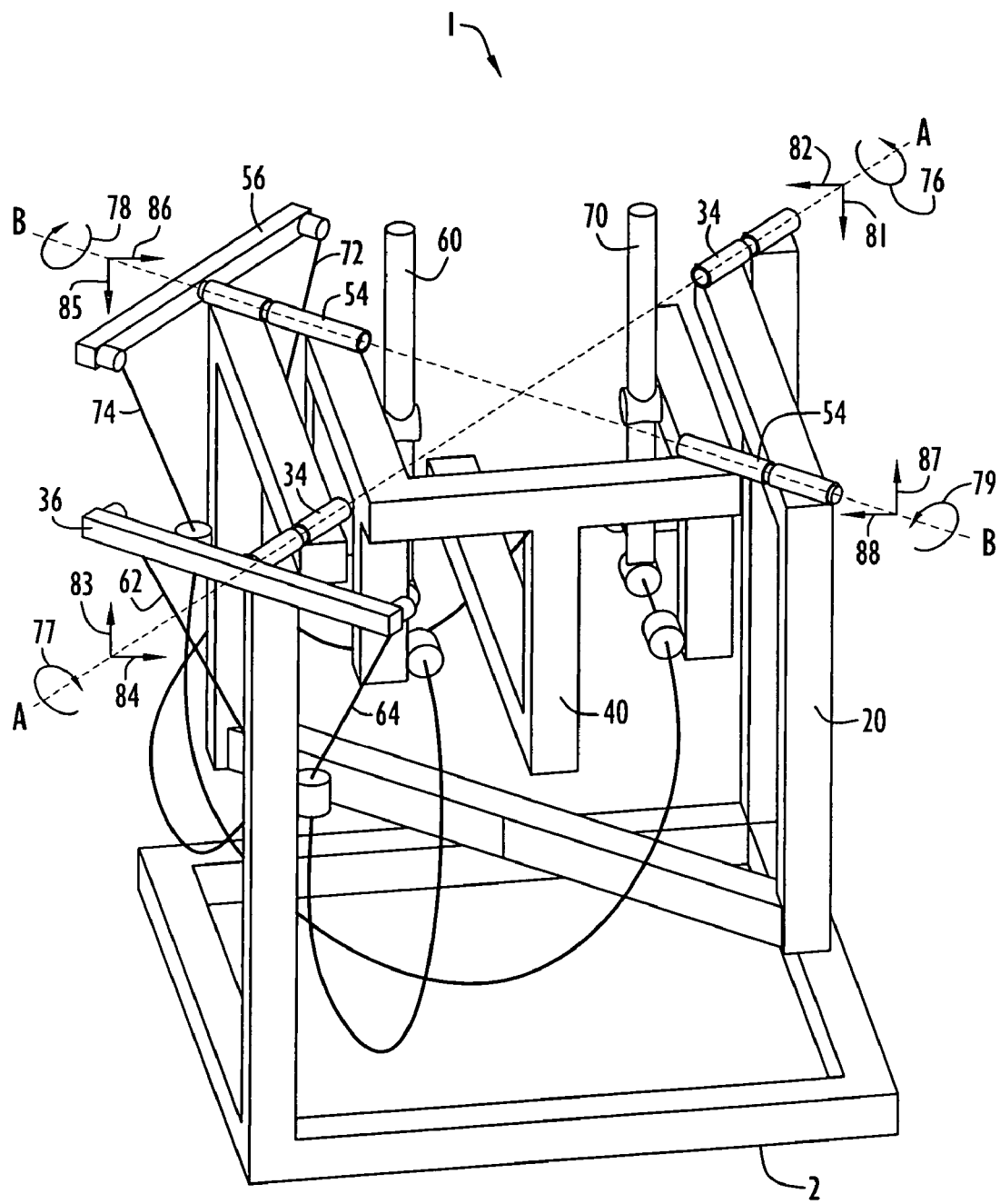
FIG. 3 is a rear view in perspective of the system of FIG. 1.

A plural frame motion system according to the present invention is illustrated in FIGS. 1-3. Specifically, system 1 includes an outer frame 2, an intermediate frame 20 nested within and supported by outer frame 2, and an inner frame 40 nested within and supported by intermediate frame 20. Each frame is constructed of a suitably rigid material (e.g., metal, such as steel, copper, aluminum and alloys thereof, plastics; etc.) capable of supporting one or more individuals within the inner frame for operation of the system as described below.

Outer frame 2 includes a lower section or base 4 that engages a supporting surface. Base 4 includes a plurality of elongated support members 5 oriented in a generally horizontal fashion 13 and joined together to form a substantially rectangular and frame-like configuration with corners 13 and 15 disposed at the front end of system 1 and corners 14 and 16 disposed at the system rear end. A first elongated post 8 extends in a generally vertical and upward direction (i.e., in a direction away from the surface that supports system 1) from front corner 13, while a second elongated post 10 extends in a generally vertical and upward direction from rear corner 14 located diagonally opposite front corner 13. Each post 8, 10 includes substantially the same longitudinal dimension and has secured at its upper end a pivotal connection member 12 that facilitates pivotal connection of intermediate frame 20 to outer frame 2 in the manner described below. One or both of posts 8 and 10 may optionally include cable support members 11 (e.g., support brackets) to support actuating cables as described below. It is to be understood that the terms "upward", "downward", "top", "bottom", "side", "front", "rear", "upper", "lower", "vertical", "horizontal", "height", "width", "length" and the like are used herein merely to describe points of reference and do not limit the present invention to any specific orientation or configuration.

Intermediate frame 20 includes a generally U-shaped section 21 formed by an elongated lower post 22 arranged in a generally horizontal orientation and two elongated posts 24 extending in a generally vertical and upward direction from the opposing longitudinal ends of lower post 22. Posts 24 include substantially the same longitudinal dimension, while the longitudinal dimension of post 22 is slightly less than the distance between diagonally opposing front and rear corners 15, 16 of outer frame base 4. The intermediate frame is suspended above outer frame base 4 and between outer frame posts 8 and 10 by elongated upper posts 26 arranged in a generally horizontal orientation and extending from the upper ends of vertical posts 24. Horizontal upper posts 26 are coupled to outer frame vertical posts 8 and 10 via pivotal connection members 12. Specifically, U-shaped section 21 is oriented within outer frame 2 such that lower horizontal post 22 is suspended a selected distance above base 4 and extends generally parallel with an axis intersecting diagonally opposing front and rear base corners 15 and 16 (i.e., the free corners of the outer frame base that do not connect with posts 8 and 10). The upper horizontal posts 26 of intermediate frame 20 are generally in parallel with each other between the front and rear of the outer frame such that each of their free ends terminates at a location proximate the upper end of a respective vertical outer frame post 8, 10. The intermediate frame is further suspended and aligned within outer frame 2 such that upper horizontal posts 26 are generally coplanar with the upper ends of posts 8 and 10.

Pivotal connection members 12 pivotally secure the free ends of each upper horizontal post 26 of intermediate frame 20 to the upper ends of outer frame posts 8 and 10. Each pivotal connection member 12 includes a hollow, cylindrical casing 32 secured to the upper end of a corresponding post 8, 10 and a generally cylindrical axle 34 supported by and extending through the casing and secured to the free end of a corresponding upper horizontal post 26 of intermediate frame 20. Thus, one pivotal connection member 12 is disposed at the front end of the system (i.e., at a location corresponding to outer frame base corner 13) and the other member 12 is disposed at the rear end of the system (i.e., at a location corresponding to outer frame base corner 14). The design of the casings and axles is suitable to permit a selected degree of rotational movement of each axle about its longitudinal axis, while being maintained within its corresponding casing. Further, the casings and axles are suitably aligned and connected with the intermediate and outer frames such that the longitudinal axis of axle 34 of each connection member 12 is aligned along an axis A. In essence, the connection member axles serve as a combined split axle to facilitate a selected degree of rotational movement of intermediate frame 20 about bearing axis A with respect to outer frame 2.

At least one of the pivotal connection members further includes a pivotal actuating member coupled to a corresponding axle to enable a selected degree of rotational movement of the axle in a certain rotational direction, which in turn produces a corresponding rotational movement of the intermediate frame with respect to the outer frame about bearing axis A. A suitable pivotal actuating member is depicted in system 1 as an elongated pivotal lever 36 connected to axle 34 at vertical post 10 of the outer frame. However, it is noted that any suitable actuating member may be provided to one or both of the pivotal connection members secured at the outer frame vertical posts to effect rotational movement of the axles and thus the intermediate frame.

Pivotal lever 36 is connected at a selected intermediate location to an end of axle 34 that extends through casing 32 to an exterior position slightly beyond post 10 and outside of outer frame 2. Cables 62 and 64 are attached to respective ends of lever 36 and extend to an actuator 60 as described below. Pivotal lever 36 facilitates rotation of rear end axle 34 located at the upper end of post 10 and intermediate frame 20, while front end axle 34 secured at the upper end of post 8 rotates in correspondence with the rear end axle as a result of torque being transmitted through intermediate frame 20 by the pivotal lever.

Inner frame 40 includes a U-shaped section 41 formed by an elongated post 42 arranged in a generally horizontal orientation and a plurality of elongated posts 44 arranged in a generally horizontal orientation and extending from the longitudinal ends of post 42. Inner frame 40 is nested within intermediate frame 20 and suspended above horizontal lower post 22 of the intermediate frame by coupling of portions of U-shaped section 41 to upper horizontal posts 26 of the intermediate frame via pivotal connection members 50 as described below. U-shaped section 41 is oriented in a generally coplanar relationship with upper horizontal posts 26 of the intermediate frame, with horizontal posts 44 of the U-shaped section extending from post 42 toward the system front end (i.e., in a direction toward front corners 13 and 15 of outer frame base 4).

The inner frame further includes an L-shaped section 45 including an elongated post 46 extending in a generally vertical and downward direction (i.e., toward outer frame base 4) from an intermediate section of horizontal post 42 to an elongated post 47 that is arranged in a generally horizontal orientation and extends a selected distance toward the system front end. The combination of the U-shaped and L-shaped sections of the inner frame basically defines an enclosure suitable for securing one or more individuals therein during system operation. In an exemplary embodiment, the dimensions of the defined enclosure may be designed to accommodate one or more individuals in a seated position, particularly if a cushioned seat or other suitable structure (not shown) is coupled to the U-shaped and L-shaped sections. As can be clearly seen from FIGS. 1-3, the outer, intermediate and inner frames are dimensioned and coupled together such that the inner frame is situated at a generally central location within an area defined by outer frame base 4.

The inner frame may optionally include cable support structures to support cables extending between axle actuating members disposed near the rotating axles and actuators 60 and 70 that apply force so as to actuate the axle actuating members as described below. Inner frame 40 includes a plurality of elongated posts 48 each extending in a generally vertical and downward direction from a location on a horizontal post 44 near a post longitudinal end. Each post 48 includes a bracket 49 for supporting a portion of a corresponding cable so as to stabilize the cable during actuation of the axle actuation members.

The inner frame is coupled to the intermediate frame via pivotal connection members 50 that are substantially similar to pivotal connection members 12 which couple the intermediate frame to the outer frame. Specifically, a pivotal connection member 50 is disposed toward the front end of the outer frame opposite vertical post 8, while another member 50 is disposed toward the rear end of the outer frame opposite vertical post 10. Each pivotal connection member 50 includes a hollow, cylindrical casing 52 secured to a corresponding upper horizontal post 26 of the intermediate frame directly above the location where the horizontal post 26 connects with its corresponding vertical post 24. A generally cylindrical axle 54 is supported within and extends through each casing 52 to connect with a portion of U-shaped section 41 of the inner frame. In particular, axle 54 located at the system front end is connected to the front end (i.e., the end extending to the front of the system) of a corresponding horizontal post 44 of the inner frame, while axle 54 located at the system rear end is connected to a corner formed by the connection of a corresponding horizontal post 44 and horizontal post 42 of the inner frame. The design of the casings and axles of members 50 is suitable to permit a selected degree of rotational movement of each axle about its longitudinal axis while being maintained within its corresponding casing. Further, the casings and axles of members 50 are suitably aligned and connected with the intermediate and inner frames such that the longitudinal axes of the axle of each member 50 is aligned along an axis B, where axis B is substantially perpendicular to axis A and intersects that axis at a center of the inner frame. The connection member axles basically serve as a combined split axle to facilitate a selected degree of rotational movement of inner frame 40 about its bearing axis B with respect to intermediate frame 20.

At least one of the pivotal connection members 50 further includes a pivotal actuating member coupled to a corresponding axle to enable a selected degree of rotational movement of the axle in a certain rotational direction, which in turn produces a corresponding rotational movement of the inner frame with respect to the intermediate frame about bearing axis B. The pivotal actuating member for rotating the inner frame with respect to the intermediate frame is substantially similar to the pivotal actuating member described above facilitating rotation of the intermediate frame with respect to the outer frame. Specifically, the pivotal actuating member includes a pivotal lever 56 connected to axle 54 located at the system front end. Pivotal lever 56 is connected at an intermediate location to an end of axle 54 that extends slightly through a corresponding casing 52 to a position beyond intermediate frame 20. Cables 72 and 74 are attached to respective ends of lever 56 and extend to an actuator 70 as described below. Pivotal lever 56 facilitates rotation of front end axle 54 and inner frame 40, while rear end axle 54 rotates in correspondence with front end axle 54 as a result of torque being transmitted through the inner frame by pivotal lever 56.

At least one actuator is preferably disposed at one or more suitable locations on the inner frame that are accessible to one or more individuals positioned within the inner frame of the system. In particular, actuators 60 and 70 are pivotally secured to respective horizontal posts 44 of the inner frame at an intermediate section of the posts. Actuators 60 and 70 are elongated in the form of handles to permit an individual (e.g., in a seated position within inner frame 40) to engage actuators 60 and 70 by hand. Cables 62 and 64 are attached to a lower end of actuator 60 and extend and attach to opposing ends of pivotal lever 36. Similarly, cables 72 and 74 are attached to a lower end of actuator 70 and extend and attach to opposing ends of pivotal lever 56. Cables 62 and 64 may optionally be supported by brackets 49 on corresponding vertical posts 48 of the inner frame as well as by brackets 11 on vertical post 10 of the outer frame. Similarly, cables 72 and 74 may be optionally supported by brackets 49 on corresponding vertical posts 48 of the inner frame as well as by brackets 43 located on the vertical post 24 of the intermediate frame located near the system front end. The cable supporting brackets provide guiding support while permitting sliding movement of the cables with respect to the brackets during actuation of the pivotal levers as described below.

Actuators 60 and 70 are pivotally secured to inner frame horizontal posts 44 in any suitable manner to permit a selected degree of pivotal movement of each actuator in a forward direction toward the system front end and in a reverse direction toward the rear end of the system. Actuator 60 controls pivotal movement of intermediate frame 20 with respect to outer frame 2 about bearing axis A by movement of the actuator in the forward or reverse direction (e.g., by an individual pushing forward or pulling back actuator 60 when seated in a position in which the individual faces the front end of the system). Specifically, pivotal movement of actuator 60 in the forward direction exerts a pulling tension on cable 62 and a pushing tension on cable 64. Cable 62 applies a force to and directs downward a first end of pivotal lever 36, while cable 64 similarly applies a force to and directs upward a second end of that lever. These applied forces in turn generate a torque on rear end axle 34 secured to lever 36, forcing axles 34 of each member 12 and intermediate frame 20 to which they are attached to rotate to a selected degree and in a selected direction about axis A (represented by rotational arrow 76 in FIG. 3), where the rotation includes a downward component (represented by arrow 81 in FIG. 3) and a first lateral component (represented by arrow 82 in FIG. 3) that is normal to the downward component. In contrast, pivotal movement of actuator 60 in the reverse direction exerts a pulling tension on cable 64 and a pushing tension on cable 62. Cable 64 applies a force and directs downward the second end of pivotal lever 36, while cable 62 similarly applies a force and directs upward the first end of that lever. These applied forces generate a torque on rear end axle 34 connected to lever 36 and results in rotation to a selected degree and in a selected direction of front and rear end axles 34 and intermediate frame 20 about axis A (represented by rotational arrow 77 in FIG. 3). This rotation includes an upward component (represented by arrow 83 in FIG. 3) and a second lateral component (represented by arrow 84 in FIG. 3) normal to the upward component and in an opposing direction of first lateral component 82. Since inner frame 40 is coupled to intermediate frame 20, the inner frame will move in general alignment with the intermediate frame, absent any manipulation of pivotal lever 56, when the intermediate frame pivots about corresponding bearing axis A in response to manipulation of actuator 60.

Similarly, actuator 70 controls pivotal movement of inner frame 40 with respect to intermediate frame 20 about bearing axis B by moving actuator 70 in the forward or reverse direction. Specifically, pivotal movement of actuator 70 in the forward direction exerts a pulling tension on cable 72 and a pushing tension on cable 74. Cable 72 applies a force and directs downward a first end of pivotal lever 56, while cable 74 similarly applies a force and directs upward a second end of that lever. These applied forces generate a torque on front end axle 54 secured to lever 56 and a resultant rotation to a selected degree and in a selected direction of front and rear end axles 54 and inner frame 40 about axis B (represented by arrow 78 in FIG. 3). This rotation includes a downward component (represented by arrow 85 in FIG. 3) and a third lateral component (represented by arrow 86 in FIG. 3) normal to the upward component. In contrast, pivotal movement of actuator 70 in the reverse direction exerts a pulling tension on cable 74 and a pushing tension on cable 72. Cable 74 applies a force and directs downward the second end of pivotal lever 56, while cable 72 similarly applies a force and directs upward the first end of that lever. These applied forces generate a torque on front end axle 54 connected to lever 56 that results in a rotation to a selected degree and in a selected direction of front and rear end axles 54 and inner frame 40 about axis B (represented by rotational arrow 79 in FIG. 3). This rotation includes an upward component (represented by arrow 87 in FIG. 3) and a fourth lateral component (represented by arrow 88 in FIG. 3) that is normal to the upward component and is in an opposing direction to the third lateral component 86.

Operation of system 1 to effect rotational movements of the inner frame is now described with reference to FIGS. 2-7. In particular, actuators 60 and 70 may be manipulated during system operation to achieve a synthetic forward or reverse pitch rotation as well as a synthetic side-to-side roll rotation of inner frame 40 as described below. Basically, the inner frame rotates in a forward or reverse pitch in relation to the outer frame by manipulating both actuators in the same direction to rotate the intermediate and inner frames about their respective axes A and B, resulting in a combined rotation of the inner frame about an axis X (FIG. 2) that extends through a center of the inner frame and between lateral sides of the system. The inner frame experiences a side-to-side roll by manipulating actuators in opposite directions to rotate the intermediate and inner frames about their respective axes A and B, resulting in a combined rotation of the inner frame about an axis Y (FIG. 2) that extends through the center of the inner frame and between the front and rear sides of the system. Rotational axes X and Y are perpendicular to each other and are each shifted by approximately 45° from each of the bearing axes A and B of the intermediate and inner frames.

Figure 4:
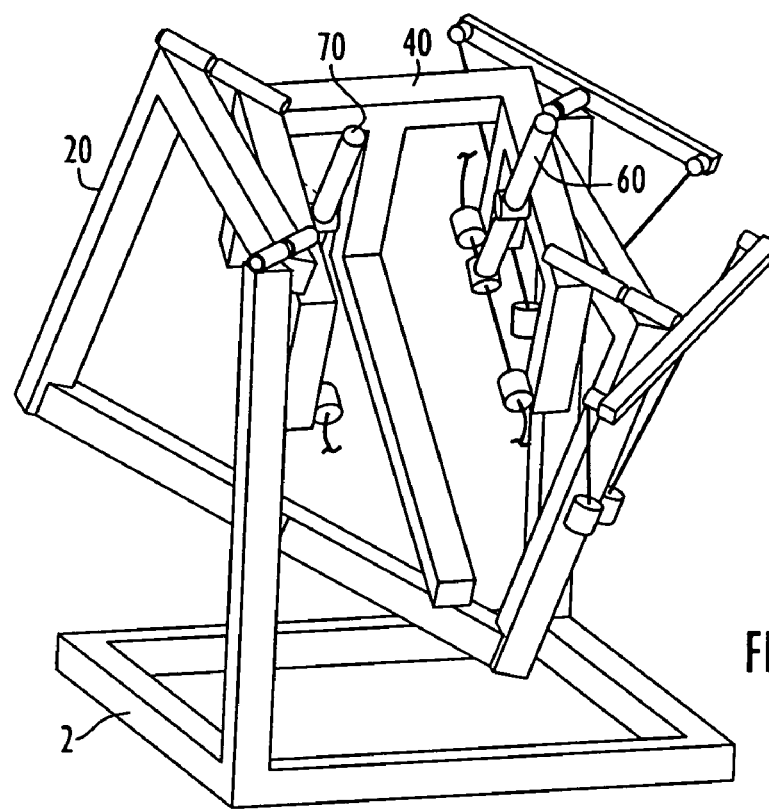
FIG. 4 is a front view in perspective of the system of FIG. 1 with the inner frame of the system rotated in a downward pitch orientation with respect to the outer frame.
Figure 5:
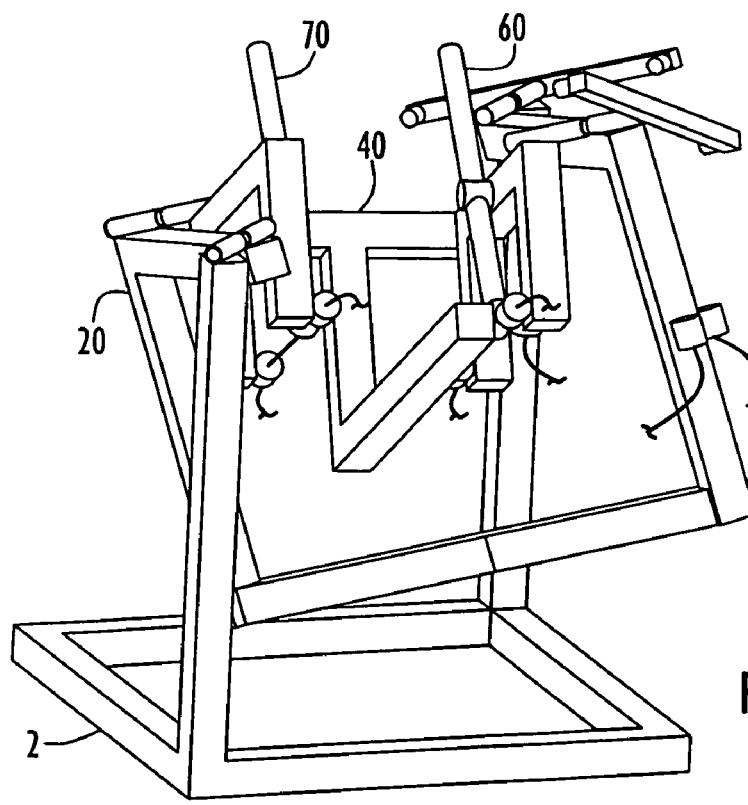
FIG. 5 is a front view in perspective of the system of FIG. 1 with the inner frame of the system rotated in an upward pitch orientation with respect to the outer frame.

A forward pitch rotation of inner frame 40 with respect to outer frame 2 is achieved by manipulating both actuators 60, 70 in a forward position as illustrated in FIG. 4. Specifically, forward motion of both actuators effects a corresponding rotation as noted above for the intermediate and inner frames about their respective bearing axes A and B. The complete rotations of the intermediate and inner frames results in a combination of their downward rotational components (represented by arrows 81 and 85 in FIG. 3) and a cancellation of their first and third lateral rotational components (represented by arrows 82 and 86 in FIG. 3), resulting in net forward pitch rotation of the inner frame about axis X in relation to the outer frame. A similar reverse pitch rotation of the inner frame about axis X is achieved by manipulating both actuators 60, 70 in a reverse direction as illustrated in FIG. 5. In this situation, the upward rotational components (represented by arrows 83 and 87 in FIG. 3) are combined and the second and fourth lateral rotational components (represented by arrows 84 and 88 in FIG. 3) cancel each other upon completion of the rotations of the intermediate and inner frames about their respective axes, resulting in the net reverse pitch rotation of the inner frame about axis X in relation to the outer frame.

Figure 6:
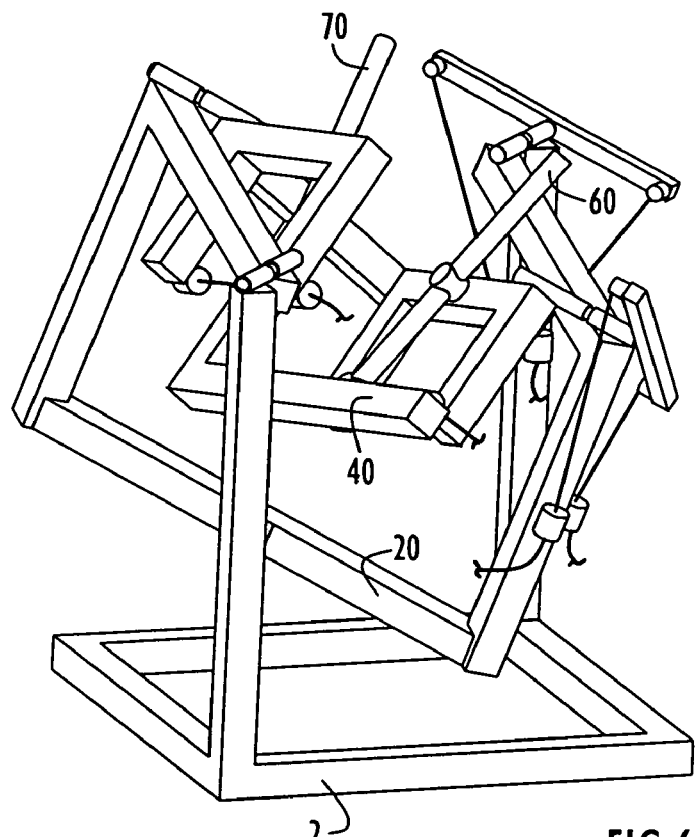
FIG. 6 is a front view in perspective of the system of FIG. 1 with the inner frame of the system rotated in a roll orientation to one side with respect to the outer frame.
Figure 7:
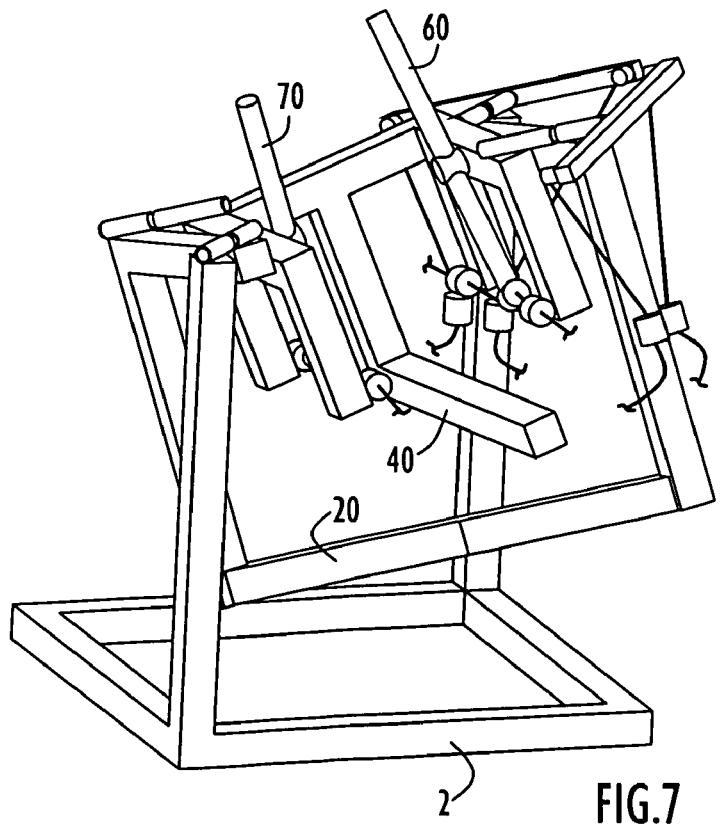
FIG. 7 is a front view in perspective of the system of FIG. 1 with the inner frame of the system rotated in a roll orientation to another side with respect to the outer frame.

Side-to-side roll rotations of the inner frame about axis Y in relation to the outer frame are achieved by manipulating the actuators in opposite directions. For example, a roll rotation of the inner frame to one side can be achieved, as illustrated in FIG. 6, by manipulating actuator 60 in a forward position and manipulating actuator 70 in a reverse position. In this situation, the first and fourth lateral rotational components (represented by arrows 82 and 88 in FIG. 3) are combined while the downward and upward rotational components (represented by arrows 81 and 87 in FIG. 3) cancel each other upon completion of the rotations of the intermediate and inner frames about their respective A and B axes, resulting in the net roll rotation of the inner frame about axis Y with respect to one side of the outer frame as depicted in FIG. 6. In contrast, manipulating actuator 60 in a reverse position and manipulating actuator 70 in a forward position, as illustrated in FIG. 7, results in a combination of the second and third lateral rotational components (represented by arrows 84 and 86 in FIG. 3) while the upward and downward rotational components (represented by arrows 83 and 85 in FIG. 3) cancel each other upon completion of the rotations of the frames about their respective axes. This combination results in a net roll rotation of the inner frame about axis Y with respect to an opposing side of the outer frame as depicted in FIG. 7.

Thus, the system of the present invention provides a compact frame design that facilitates rotation of an inner user supporting frame about plural axes, thereby providing at least two degrees of freedom of movement simply by manipulation of one or more actuators. In addition, positioning of the pivotal bearing axes for the nested frames within the system so as to achieve an effective pitch or roll rotation of the inner frame along axes that are shifted 45° from the frame bearing axes allows easy ingress and egress to the inner frame by one or more users while minimizing undesirable rotational movement of the inner frame. In other words, the system basically displaces inner frame axes of rotation by approximately 45° to provide space for ingress and egress of users to that frame.

The system of the present invention further provides a mechanically simple mechanism of operating the actuators that is intuitive to a user to effect pitch and roll orientations of the inner frame with respect to the outer frame. For example, in the system described above, manipulation of both actuators in the same direction effects a pitch rotation to simulate a dive or a climb, while manipulation of the actuators in opposite directions effects a side-to-side rotation to simulate a roll. Other mechanisms known in the art, such as Stewart and Gough platforms or conventional gimbal frames, require more complex and less operator intuitive mechanisms to produce similar pitch and roll effects.

While the system described above and illustrated in FIGS. 1-7 utilizes a purely mechanical actuation of the actuators to effect rotational movement of the inner frame with respect to the outer frame, it is noted that any suitable combination of mechanical and/or electrical actuation devices may be employed to effect a desired rotation of the inner user supporting frame. For example, servomotors may be utilized in combination with one or more suitable actuators (e.g., a keyboard, one or more switches, handles, buttons, joysticks, sensors, etc.) to pivot the intermediate and inner frames on their bearing axes to a selected degree and in a selected direction. Alternatively, rotational movements of the inner and intermediate frames within the system may be controlled automatically (e.g., by a controller as described below) such that no user actuation may be required to effect rotational movements such as pitch and roll of the inner frame.

In addition, any combination of suitable axle actuating devices may be provided to effect rotation of the frames about the frame bearing axes. For example, one or more rotary gears may be provided as an alternative to the pivotal levers described above, where the gears are connected at their hubs to a corresponding axle and include one or more cables connecting to outer circumferential sections of the gears to effect the desired rotational movement of the gears, bearing axles and corresponding frames. In embodiments employing servomotors or other electrically controlled actuating devices to rotate the inner and intermediate frames about their bearing axes, cables that connect between the actuators and the actuating devices may optionally be replaced with electrical wires connected to sensors (e.g., optical sensors, magnetic sensors, strain gauge sensors, etc.) that detect degrees of movement of the actuators and relay such information to the actuating devices to effect corresponding pivotal movement of the frames. Alternatively, wireless communication devices (e.g., infrared or RF) may be provided to effect communication between sensors and actuating devices so as to eliminate electrical wiring extending therebetween.

Figure 8:
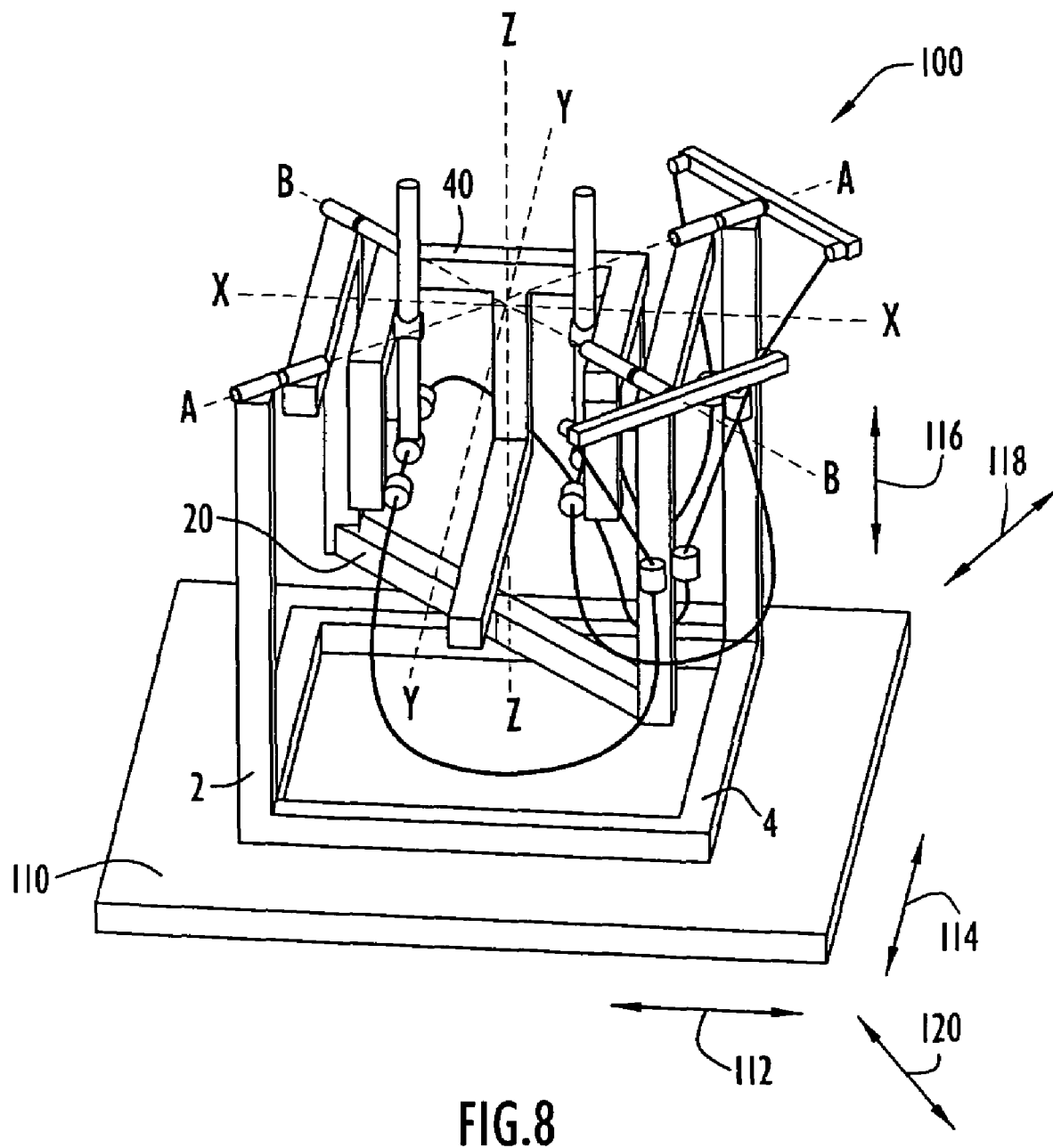
FIG. 8 is a front view in perspective of another embodiment of a plural frame system in accordance with the present invention.

The previously described system may be further modified to facilitate movement of the outer frame, and thus the intermediate and inner frames, in additional degrees of freedom. An exemplary embodiment of a modified system is illustrated in FIG. 8. System 100 is substantially similar in design and operability to the previously described system, with outer frame 2 supporting nested intermediate and inner frames 20 and 40 and facilitating pivotal movement of these nested frames about their bearing axes A and B as described above to achieve rotational movements of the inner frame with respect to the outer frame about axes X and Y. System 100 further includes a platform 110 upon which base 4 of outer frame 2 is supported. Platform 110 may be coupled to any suitable structure to effect any combination of linear and/or rotational movements of the outer frame. For example, platform 110 may be coupled to a rotating member to facilitate rotation of the outer frame, and thus the intermediate and inner frames, about a vertical axis Z which extends through a center of the inner frame. Alternatively, or in addition to being coupled to a rotating member, platform 110 may be coupled to one or more other driving members to effect linear movement of the frames in any directions parallel and/or transverse the rotational axes X, Y and Z (e.g., refer to arrows 112, 114, 116, 118 and 120 in FIG. 8 representing the directions in which the outer, intermediate and inner frames may be moved). Thus, system 100 effects rotational as well as linear movements of the inner frame about or with respect to plural axes for a wide variety of applications, including applications requiring pitch (i.e., rotation about axis X), roll (i.e., rotation about axis Y) and yaw (i.e., rotation about axis Z) movements of the inner frame. The system may further include one or more additional actuators (not shown) to enable a user to control rotation of the platform, and one or more sensors to measure platform rotation and provide the information to a computer for virtual environments as described below.

Examples of applications that may utilize the previously described systems include, without limitation, flight and/or other simulation devices, exercise devices and entertainment devices. A system of the present invention may be combined with a suitable controller (e.g., a computer system) and a suitable display (e.g., a monitor or a helmet mounted display) for simulating different types of training and/or entertainment activities in a virtual reality scenario. Actuators 60, 70 may be optional, where the controller controls system actuation to simulate various conditions (e.g., turbulence, terrain, etc.). In addition, encoders or potentiometers may be coupled to any of the pivoting frames, actuators, actuating members, bearing axles, platforms, axes, etc. to determine the amount of rotational or lateral movement. This information may be relayed to the controller to correspond with and/or change conditions of a programmed simulation scenario that a user of the system is viewing on a display or to provide feedback for control of frame movement for the scenario. The controllers of any two or more systems may also communicate with each other over a network to facilitate simultaneous engagement of plural systems in the same virtual reality scenario.

Powered actuators (e.g., servomotors, hydraulic or pneumatic devices, etc.) may also be provided in addition to the intermediate and inner frame pivoting actuators to provide additional motion effects to the inner frame. For example, certain powered actuators may be provided to apply forces to the pivoting actuators, platform and other system components to achieve additional motion effects simulating turbulence. Passive and/or active actuators (e.g., caliper brakes, hydraulic servo valves, motors, hydraulic or pneumatic devices, etc.) may also be coupled with the intermediate and inner frame pivoting actuators to provide additional resistance effects. When applying the powered and resistance actuators to the embodiments described above, the actuators effecting pivotal movement of the intermediate and inner frames as well as the outer frame and/or platform supporting the outer frame experience the haptic effect. Exemplary applications for these types of resistance actuators include exercise devices. For example, when utilizing handles as actuators to effect a mechanical pivoting of the intermediate and inner frames based upon physical exertion by a user such as in the system illustrated in FIG. 1, resistance actuators may be employed to increase or decrease the level of resistance associated with manipulation of one or both of the handles to effect pivotal movement of one or both of the intermediate and inner frames. In addition, other resistance controlled elements, such as cycling pedals for engaging with a user's feet, may be provided in the exercise device that can also be manipulated by the user in combination with the handle actuators.

Figure 9:
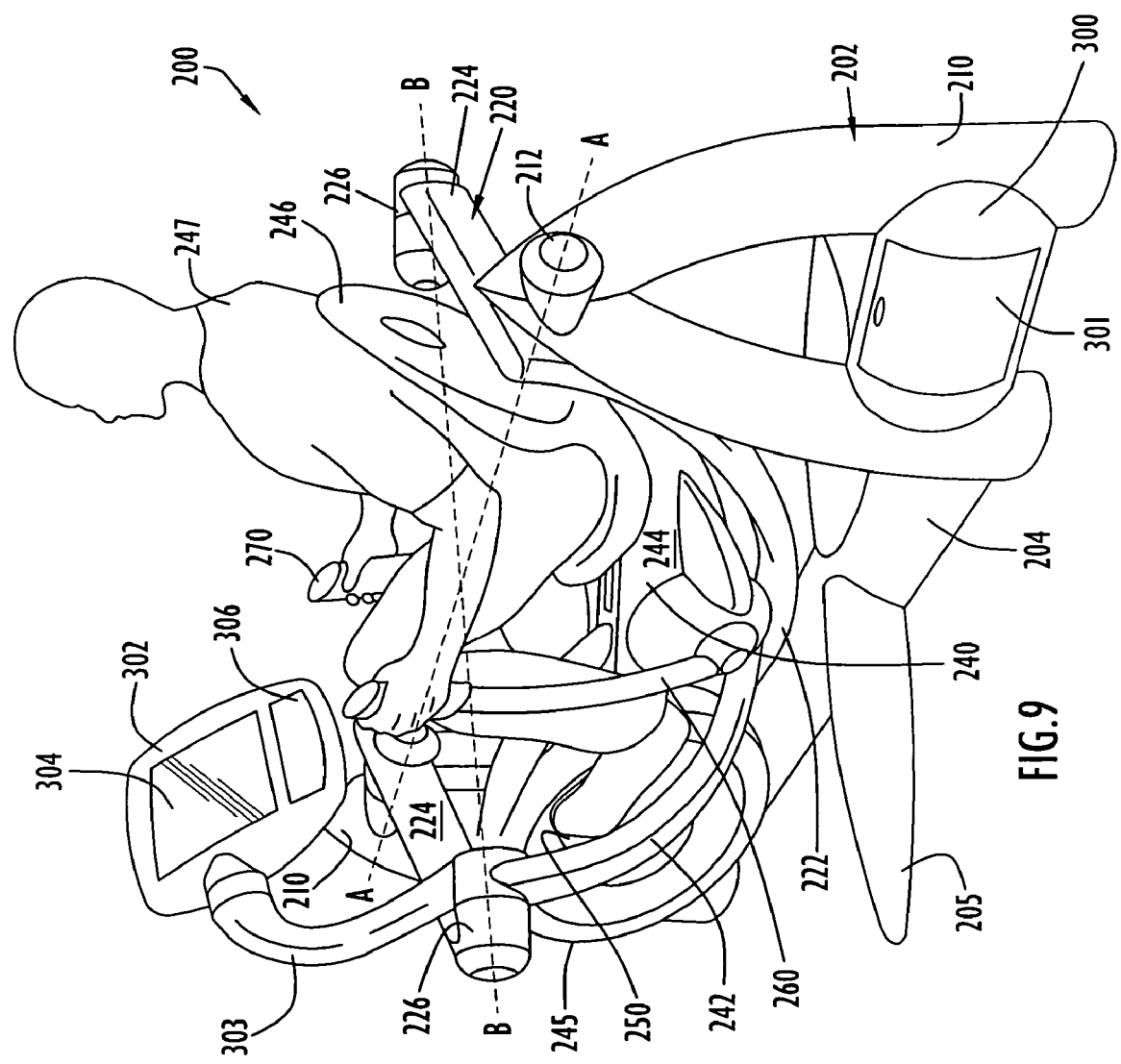
FIG. 9 is a view in perspective of a third embodiment of a plural frame system incorporated into an exercise device in accordance with the present invention.

An exemplary embodiment of a virtual reality exercise device utilizing a plural frame system of the present invention is illustrated in FIG. 9. Specifically, system 200 is a cycling type exercise device employing a computer system and a display or monitor 302 to provide virtual reality scenarios for the system that are interactive with a user's manipulation of handle actuators 260 and 270 and foot pedal actuators 250 as described below. System 200 includes an outer frame 202, an intermediate frame 220 and an inner frame 240 arranged to function in a manner similar to that of the plural frame system described above to facilitate motion of the inner frame relative to the outer frame. Outer frame 202 includes an elongated and generally horizontal base member 204 that engages a supporting surface. A pair of wing shaped members 205 extend transversely and in opposing directions from an intermediate section of the base member. The wing shaped members engage a supporting surface for system 200 to provide stability for the system during pivotal movement of the intermediate and inner frames relative to and supported by outer frame 202. A pair of generally vertical and tubular A-shaped members 210 are attached at opposing longitudinal ends of the base member 204. Each of the A-shaped members 210 includes a pivotal support connection member 212 located at an apex of that member 212 for supporting intermediate frame 220 as described below.

Intermediate frame 220 is supported by the outer frame and includes a semi-circular tubular member 222 oriented with a convex surface facing base member 204 and extending between with opposing ends proximate the apexes of A-shaped members 210. A pair of tubular members 224 are oriented in a generally horizontal fashion and extend from opposing ends of semi-circular member 222 in a generally parallel alignment and in opposing directions with respect to each other. The opposing ends of semi-circular member 222 are further pivotally coupled to the apexes of A-shaped members 210 via the pivotal connection members 212 such that the intermediate frame is supported by the outer frame and suspended above base member 204. Pivotal connection members 212 are aligned along axis A to facilitate rotational movement of the intermediate frame with respect to the outer frame about axis A. The free end of each horizontal member 224 includes a pivotal connection member 226 for supporting inner frame 240 as described below.

Inner frame 240 includes a semi-circular tubular member 242 oriented with a convex surface facing semi-circular member 222 of the intermediate frame and with opposing ends extending proximate the free ends of horizontal members 224. The opposing ends of semi-circular member 242 are pivotally coupled to the free ends of horizontal members 224 via a corresponding pivotal connection member 226 such that the semi-circular member of the inner frame is suspended above the semi-circular member of the intermediate frame. Pivotal connection members 226 are aligned along axis B, which is normal to axis A, and facilitate rotational movement of the inner frame with respect to the intermediate frame about axis B. A user support section 244 is connected at an intermediate concave portion of semi-circular member 242 and includes a seat 246 for supporting a user 247 during system operation. Two generally vertically oriented handle actuators 260 and 270 are pivotally connected to and extend from the user support section for manipulation by the hands of user 247. Each actuator 260, 270 may be moved in a forward or reverse direction to effect pivotal movement of a corresponding intermediate or inner frame as described below. In addition, support section 244 includes a pair of foot pedals 250 secured to a rotating flywheel 245 (e.g., or other exercise device such as stair climbing, rowing, skiing or full body, etc.) housed within the support section a suitable distance from seat 246 to permit a user's feet to engage and manipulate the foot pedals. Although flywheel 245 extends slightly below semi-circular member 242, the flywheel is suitably dimensioned to permit a desired degree of pivotal movement of the inner frame with respect to the outer frame during system operation.

Each of the pivotal connection members 212 and 226 include actuating members that effect pivotal movement to a selected degree and in a selected direction of each of the intermediate and inner frames about their respective A and B axes in response to forward or reverse movements of actuators 260 and 270. Basically, actuators 260 and 270 may be manipulated to effect pivotal movement of the intermediate and inner frames in a substantially similar manner as in the previously described systems. For example, actuator 260 may effect pivotal movement of intermediate frame 220 about axis A by actuating at least one corresponding actuating member disposed within the housing of one or both pivotal connection members 212, while actuator 270 effects pivotal movement of the inner frame about axis B by actuating at least one corresponding actuating member disposed within the housing of one or both pivotal connection members 226. The actuating members may be of any suitable type. However, it is preferred that the actuating members are electronically controlled by the computer system to facilitate integration of user manipulation of the actuators 260 and 270 with a computerized simulation displayed on monitor 302. The combined pivotal movements of the intermediate and inner frames about their respective axes in response to manipulation of both actuators 260 and 270 results in pitch and roll rotational movements of the inner frame with respect to the outer frame about axes X and Y that are substantially similar to the pitch and roll rotational movements in the previously described systems.

The computer system is housed within a horizontal section 300 of the A-shaped member 210 disposed at the rear of the outer frame, with an access panel or door 301 being disposed on the horizontal section to facilitate access to the computer system. The computer system receives input from sensors (not shown) disposed at any suitable locations in system 200 for detecting a degree of pivotal movement of each of the inner and intermediate frames and/or the amount of forward or reverse movement of the actuators 260 and 270 based upon user manipulation of the actuators. The computer system may further receive input relating to the forces applied to foot pedals 250 or the rate and direction of cycling. These measurements may be used to update a user position within or the rate the user traverses the virtual environment displayed on monitor 302 based on the amount of exercise (e.g., cycling along a path, etc.). Further, the computer system may communicate with and control resistance actuators coupled to any of actuators 260 and 270 and/or the pedal rotating gear to apply selected levels of resistance to the foot pedals and handle actuators at selected times and in accordance with the displayed virtual reality scenario (e.g., to simulate uphill/downhill, non-planar, terrain, etc.). Moreover, the computer system may include any number of suitable software packages for implementing different virtual reality scenarios during system operation. In addition, the computer system may be networked with other computer systems corresponding to other exercise devices to facilitate plural user activity in the same virtual reality scenario (e.g., competitions, sporting events, races, sports, etc.).

Display monitor 302 is connected to the inner frame at a front end of the system to facilitate viewing by the user during system operation. Specifically, monitor 302 is connected via a tubular member 303 to a front end of semi-circular member 242. Thus, monitor 302 follows the motion of the inner frame and maintains the user perspective during system operation. The monitor includes a display screen 304 and an input device 306 (e.g., a keyboard, mouse, voice recognition, etc.) to facilitate input of selected information by a user prior to, during and/or after a simulation scenario.

System operation may be initiated when user 247 is positioned on seat 246 as illustrated in FIG. 9. The user may input selected information to the computer system via input device 306 (e.g., selecting a particular simulation scenario, selected resistance or other conditions for the scenario, user physical characteristics, etc.) prior to initiating the scenario. During operation, the selected scenario is displayed on screen 304, and user 247 manipulates pedals 250 and/or handle actuators 260 and 270 based upon displayed criteria. The computer system detects manipulation of the pedals and/or the handle actuators, via the sensors, and controls the virtual images displayed on monitor screen 304 based upon such inputs. Basically, the pedals and actuators enable the user to navigate through the virtual environment.

For example, when the handle actuators 260 and 270 are manipulated to effect a forward pitch rotation of the inner frame, a corresponding dive orientation (e.g., toward the ground) or travel direction in the virtual reality scenario may be displayed on display screen 302. When the handle actuators 260 and 270 are manipulated to effect a reverse pitch rotation of the inner frame, a corresponding climb orientation (e.g., toward the sky) or travel direction in the virtual reality scenario may be displayed on the display screen. Similarly, roll rotations of the inner frame to either side may result in a corresponding roll orientation (e.g., a rotation of the horizon representing a turning motion) or travel direction in the virtual reality scenario being displayed on the display screen. Operation of the pedals 250 may produce a simulated traversing of terrain in the virtual reality scenario as indicated by the display screen, whereby the rate of travel through the virtual environment is proportional to the rate of pedaling. The computer system may further adjust the resistance levels applied to the foot pedals and/or the handle actuators by the resistance actuators to implement artificial physical conditions (e.g., traveling uphill or downhill, encountering wind resistance, etc.) corresponding to the virtual reality scenario displayed on the display screen. Thus, manipulation of the handle actuators and foot pedals by the user during a virtual reality scenario session results in exercise of both upper and lower body muscle groups, where the difficulty of the exercise can be selectively varied throughout the session based upon the resistance levels applied to the handle actuators and foot pedals. If the system is linked to other systems (e.g., via a network or other communications medium) plural users may participate in the same virtual reality scenario session, thus facilitating competitive interaction (e.g., team races) between two or more users within the session.

Figure 10:
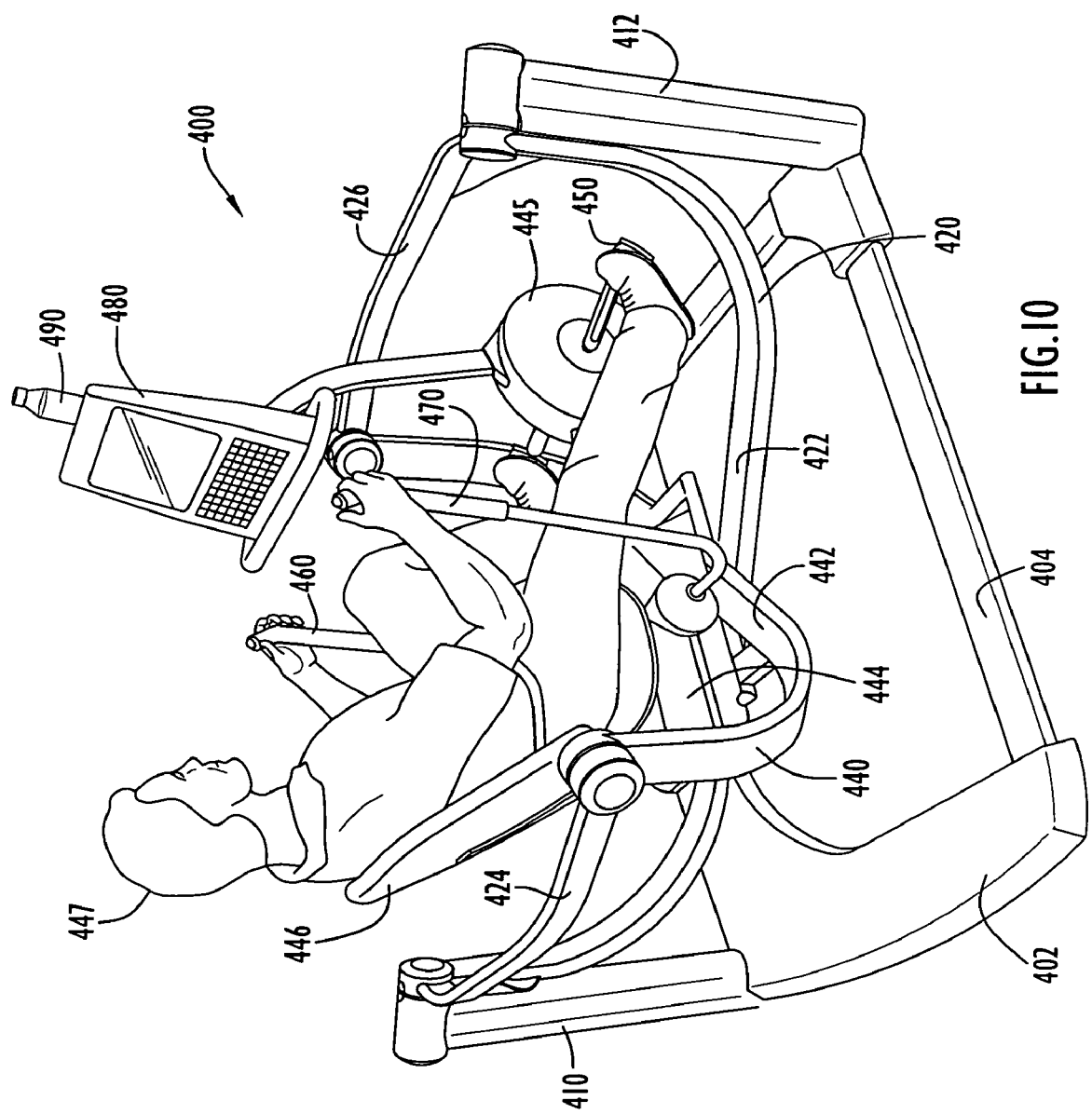
FIG. 10 is a view in perspective of an alternative embodiment of a plural frame system incorporated into an exercise device in accordance with the present invention.

A further exemplary embodiment of a virtual reality exercise device utilizing a plural frame system of the present invention is illustrated in FIG. 10. Basically, system 400 is a cycling type exercise device substantially similar to the exercise device of FIG. 9 but with a modification to the inner, intermediate and outer frames. System 400 employs a computer system (not shown) and a display or monitor 480 to provide virtual reality scenarios for the system. These scenarios are interactive with a user's manipulation of handle actuators 460 and 470 and foot pedal actuators 450 in substantially the same manner described above for the system of FIG. 9.

The system includes an outer frame 402, an intermediate frame 420 and an inner frame 440 arranged to function in a manner similar to that of the plural frame systems described above to facilitate motion of the inner frame relative to the outer frame. Outer frame 402 includes a generally horizontal and rectangular base member 404 that engages a supporting surface, and a pair of support posts 410, 412 extending upward at opposing corners of the base member. The intermediate frame includes a curved member 422 having a convex surface facing base member 404 and extending between opposing corners of the outer frame to pivotally connect with support posts 410, 412. Extending in a generally horizontal orientation and in opposing directions from the ends of curved member 422 are support members 424, 426. Inner frame 440 similarly includes a curved member 442 having a convex surface facing the intermediate frame curved member. The inner frame extends toward and pivotally connects with intermediate frame support members 424, 426.

A user support section 444 is connected at an intermediate concave portion of the inner frame and includes a seat 446 for supporting a user 447 during system operation. Two generally vertically oriented handle actuators 460 and 470 are pivotally connected to and extend from the user support section for manipulation by the hands of user 447. Each actuator 460, 470 may be moved in a forward or reverse direction to effect pivotal movement of a corresponding intermediate or inner frame in a substantially similar manner as the previously described system of FIG. 9. In addition, support section 444 includes a pair of foot pedals 450 secured to a rotating flywheel 445 (e.g., or other exercise device such as stair climbing, rowing, skiing or full body, etc.) housed within the support section a suitable distance from seat 446 to permit a user's feet to engage and manipulate the foot pedals. Monitor 480 extends from an upper surface of support section 444 so as to be generally oriented in alignment with the user during system operation. Optionally, a support structure may be provided at a suitable location on monitor 480 for supporting a water bottle 490 or any other article that may be accessed by the user during system operation. The support structure may alternatively be located at any other suitable locations that are accessible by the user. System 400 operates in a substantially similar manner as the system of FIG. 9 to combine virtual reality simulation scenarios with exercising during system operation.

It will be appreciated that the embodiments described above and illustrated in the drawings represent only a few of the many ways of implementing a motion platform system and method of rotating a motion platform about plural axes.

The plural frame system may be constructed of any suitable materials, and each of the inner, intermediate and outer frames may have any suitable dimensions and configurations to facilitate pivotal bearing of the intermediate and inner frames on axes that are displaced at any desired angle from each other so as to effect rotation of the inner frame with respect to the outer frame on axes that are shifted at any desired angle from the frame bearing axes. The inner frame (and corresponding components) may be of any quantity, shape or size and may have any suitable configuration to receive and support any suitable number of individuals (e.g., at least one) in any number of positions (e.g., standing, seated, etc.) during operation of the system. The outer frame (and corresponding components) may be of any quantity, shape or size and may be supported directly on a supporting surface or secured to a platform in any suitable manner to facilitate any rotational and/or lateral movement of the frames in combination with the rotational movements of the inner frame.

The inner frame may be coupled to the intermediate frame and the intermediate frame coupled to the outer frame in any suitable manner to permit their pivotal movement about different bearing axes as described above. The systems may be designed of any suitable type and configuration to facilitate pivotal movement of the frames by physical manipulation of the user and/or manipulation utilizing electromechanical devices. The pivotal connection members of the intermediate and inner frames may be constructed of any suitable materials and have any suitable configurations. The bearing axles may be of any quantity, shape or size and may be rotatably coupled to the outer frame and secured to the intermediate frame at any locations and in any suitable manner to effect pivotal movement of the intermediate frame with respect to the outer frame. Similarly, the bearing axles may be rotatably coupled to the intermediate frame and secured to the inner frame at any locations and in any suitable manner to effect pivotal movement of the inner frame with respect to the intermediate frame.

Any suitable number of pivotal actuating members may be provided at any locations to rotate the bearing axles supporting each of the intermediate and inner frames. The pivotal actuating members may be of any suitable types and configurations (e.g., pivotal levers, rotating gears, electrical valves or motors, pneumatic or hydraulic devices, etc.) to effect pivotal movement of the intermediate and inner frames. Any suitable number of mechanical and/or electrical cables may be provided to connect actuators with pivotal actuating members. Alternatively, when utilizing electromechanical pivotal actuating members, actuators may communicate with the pivotal actuating members via a wireless communication link (e.g., IR or RF). Additionally, any suitable number of sensors of any suitable types and configurations (e.g., magnetic sensors, optical sensors, strain gauge sensors, inertial or gyroscopic sensors, etc.) may be provided at any suitable locations to detect and relay information relating to the degree of desired and/or actual rotational and/or lateral movement of any of the inner, intermediate and outer frames.

Any one or more suitable actuators of any suitable types and configurations (e.g., elongated handles as in the above-illustrated systems, buttons, switches, keyboards, joysticks, etc.) may be provided to effect actuation of the pivotal actuation members and resultant pivotal movement of the inner, intermediate and/or outer frames. The actuator or actuators are preferably located proximate the inner frame to provide access to one or more individuals supported by the inner frame. The actuators may be provided in any suitable arrangement to facilitate manipulation and exercise of any one or more muscle groups within a user's body. Further, any suitable passive and/or active actuator members may be coupled to the actuators and/or pivotal actuation members to achieve a controllable degree of resistance during manipulation of the actuators by a user. In addition, any other suitable user manipulation devices may be provided proximate the inner frame (e.g., foot pedals for operation by a user to simulate cycling, stair climbers, etc).

Any suitable number of controllers may be utilized in the system to effect control of any of the pivotal actuating members based upon inputs received from the actuators in the system. The controllers may communicate (e.g., by transmitting output instructions and/or receiving input information)

with any of the actuators, pivotal actuating members, resistance actuator members and/or sensors utilized in the system to effect a desired level of control during system operation. Further, any number of displays may be linked with the controllers and mounted at any suitable location with respect to one or more users supported within the inner frame to provide a visual display during operation of the system in a virtual reality scenario. Alternatively, any number of displays may be provided that are not mounted to any of the frames but are coupled to the controllers to provide the appropriate visual display during system operation (e.g., one or more big screen displays for viewing by a number of users). Displays may also be mounted to any one or more users (e.g., head mounted or heads up displays, etc.). The controllers may be implemented by any conventional or other computer or processing system (e.g., personal computer, etc.) and may include any number of suitable software programs for displaying a variety of different virtual reality scenarios (e.g., flying, bicycling, auto racing, etc.) or competitions (e.g., sporting type competitions, races, etc.) on the displays during system operations. The software programs may be suitably designed to alter display images based upon input information received by the controller or controllers relating to the degree of movement of the inner, intermediate and/or outer frames. For example, in a virtual reality flying scenario, manipulation of actuators to effect a side-to-side roll rotation of the inner frame with respect to the outer frame may be communicated to the controller, which in turn instructs the display, via the software program, to alter displayed images corresponding to the roll orientation of the inner frame. System controllers for two or more systems may further be linked via any suitable number of networks or other communications media to enable plural users to participate within a virtual reality scenario via plural systems located in local and/or remote environments.

The motion platform system of the present invention is not limited to the applications disclosed herein, but may be utilized for any application including pivoting of users and/or structures. For example, various structures typically for containing one or more users may be mounted on the platform facilitating pivotal and/or linear movement of the structures in accordance with control signals to simulate various conditions (e.g., gravity, turbulence, etc.) for varying purposes (e.g., flight simulators, auto simulators, amusement rides, military simulators, etc.). The motion platform may further be utilized in varying types of virtual reality or other exercise devices. For examples of various types of virtual reality exercise devices, reference is made to U.S. Pat. Nos. 5,462,503, 5,466,200, 5,584,700, 5,690,582, 5,785,630 and 5,890,995. The disclosures of these patents are incorporated herein by reference in their entireties.

From the foregoing description, it will be appreciated that the invention makes available a novel motion platform system and method of rotating a motion platform about plural axes, wherein a motion platform structure is rotated about plural virtual axes via bearing axes offset from the virtual rotation axes.

Having described preferred embodiments of a novel motion platform system and method of rotating a motion platform about plural axes, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A motion platform system comprising:
a support;
a motion platform supported by said support and rotatable about a plurality of bearing axes, wherein said motion platform is rotatable with respect to said support about at least one axis that is offset from said plurality of bearing axes, and wherein said motion platform comprises:
an intermediate frame supported by said support, said intermediate frame being rotatable about a first bearing axis with respect to said support; and
an inner frame supported by said intermediate frame, said inner frame being rotatable about a second bearing axis with respect to said intermediate frame;
wherein rotations of said inner and intermediate frames about said first and second bearing axes facilitate rotation of said inner frame with respect to said support about at least one of a third axis and a fourth axis; and
at least one actuator that is actuable to facilitate rotations of said inner and intermediate frames about respective first and second bearing axes.

2. The system of claim 1, wherein said inner frame includes a support section to support at least one user of said system during system operation.

3. The system of claim 1, further comprising:
a base coupled to said support to facilitate movement of said support with respect to said base in at least one direction.

4. The system of claim 3, wherein said at least one direction includes a rotating direction of said support with respect to said base.

5. The system of claim 1, wherein said first and second bearing axes are substantially perpendicular to each other and said third and fourth axes are respectively offset from said first and second bearing axes.

6. The system of claim 1, wherein said at least one actuator comprises a first actuator and a second actuator, said first actuator is actuated to rotate said intermediate frame about said first bearing axis, and said second actuator is actuated to rotate said inner frame about said second bearing axis.

7. The system of claim 6, wherein said first and second actuators are movable in at least two directions, said inner frame rotates about said third axis in response to moving said first and second actuators simultaneously in a first set of directions, and said inner frame rotates about said fourth axis in response to moving said first and second actuators simultaneously in a second set of directions.

8. The system of claim 1, further comprising:
a controller to control rotations of said intermediate and inner frames about said first and second bearing axes in response to actuation of said at least one actuator.

9. The system of claim 1, further comprising:
a monitor to display information relating to system operation.

10. The system of claim 9, further comprising:
a controller to control said monitor to display a virtual reality scenario that changes based upon user manipulation of said system.

11. The system of claim 10, further comprising:
an exercise assembly supported by said inner frame for manipulation by a user to exercise a user body during system operation.

12. The system of claim 11, wherein said exercise assembly includes a cycling assembly for manipulation by user feet.

13. The system of claim 11, further comprising:
at least one sensor in communication with said controller, wherein said at least one sensor measures manipulation of at least one of said inner frame, said intermediate frame, said at least one actuator and said exercise assembly and sends measured information to said controller.

14. The system of claim 11, further comprising:
at least one resistance member to adjust resistance to at least one of said intermediate frame, said inner frame, said at least one actuator and said exercise assembly to simulate conditions within said virtual reality scenario.

15. The system of claim 1, further comprising:
an exercise assembly supported by said inner frame for manipulation by a user to exercise a user body during system operation.

16. The system of claim 15, wherein said exercise assembly includes a cycling assembly for manipulation by user feet.

* * * * *